(12) United States Patent
Chang et al.

(10) Patent No.: US 7,515,158 B2
(45) Date of Patent: Apr. 7, 2009

(54) MODULARLY CONFIGURABLE MEMORY SYSTEM FOR LCD TV SYSTEM

(75) Inventors: Peter Chang, Taichung (TW); Kuan Fu Chen, Sinjhuang (TW)

(73) Assignee: Etron Technology, Inc., Hsin-Chu (TW)

( * ) Notice: Subject to any disclaimer, the term of this patent is extended or adjusted under 35 U.S.C. 154(b) by 530 days.

(21) Appl. No.: 11/158,872

(22) Filed: Jun. 22, 2005

(65) Prior Publication Data

US 2006/0294324 A1    Dec. 28, 2006

(51) Int. Cl.
*G06T 1/60* (2006.01)
(52) U.S. Cl. .................. 345/530; 711/154; 711/170
(58) Field of Classification Search .............. 345/530; 711/154, 170
See application file for complete search history.

(56) References Cited

U.S. PATENT DOCUMENTS

| | | | | |
|---|---|---|---|---|
| 4,941,107 | A | 7/1990 | Hasebe | 364/518 |
| 5,291,275 | A | 3/1994 | Lumelsky | 348/441 |
| 6,263,023 | B1 | 7/2001 | Ngai | 375/240.12 |
| 6,377,268 | B1 * | 4/2002 | Jeddeloh | 345/542 |
| 6,424,347 | B1 | 7/2002 | Kwon | 345/520 |
| 6,877,076 | B1 * | 4/2005 | Cho et al. | 711/157 |

OTHER PUBLICATIONS

International Organisation for Standardisation, ISO/IEC JTC1/SC29/WG11, Coding of Moving Pictures and Audio, Jul. 1996, pp. 1-7.

A Cost Effective HDTV Decoder IC with Integrated System Controller, Down Converter, Graphics Engine and Display Process Duardo, et al., IEEE Trans. on Cons. Elec., Aug. 1999, vol. 45, Issue: pp. 879-883.

"Memory Organization of a Single-Chip Video Signal Processing System with Embedded DRAM," Hilgenstack, et al Proc. Ninth Great Lakes Symp. on VLSI, 1999, pp. 42-45.

* cited by examiner

*Primary Examiner*—Kee M Tung
*Assistant Examiner*—David H Chu
(74) *Attorney, Agent, or Firm*—Saile Ackerman LLC; Stephen B. Ackerman; Billy Knowles

(57) ABSTRACT

A configurable memory system provides a high bandwidth, low latency, no wait state data path to a memory system functioning as a frame buffer for a digital video processing system. The configurable memory system has configurable channels that are programmable to control the access pattern of the memory controller. Once the configurable channels are programmed, the memory controller can generate the necessary address, timing, and control signals for selectively writing the data to and reading the data from the selected blocks of the array of memory devices continuously access the memory and move the data to the channel buffers. The channel buffer receives, retains, and transfers a defined segment of the data as defined by the segment pattern between the processing system and the array of memory devices, such that the processing system is able to transfer and receive the data continuously according to data requirements of the processing system.

30 Claims, 3 Drawing Sheets

FIG. 1 – Prior Art

MODULARLY CONFIGURABLE MEMORY SYSTEM FOR LCD TV SYSTEM

BACKGROUND OF THE INVENTION

1. Field of the Invention

This invention relates generally to apparatus for the control of reading and writing of data to arrays of memory devices. In particular, this invention relates to apparatus for controlling the addressing patterns for controlling reading and writing of data to arrays of memory devices configured as a frame buffer for a video processing system receiving digital television signals.

2. Description of Related Art

Audio and video for broadcast television signals, including digital satellite and Cable television are currently encoded using MPEG-2. MPEG-2 is the designation for a group of audio and video coding standards agreed upon by MPEG (Motion Pictures Coding Experts Group), and published as ISO standard 13818. MPEG-2, with some modifications, is also the coding format used by standard commercial digital video disk (DVD) movies. The MPEG-2 encoded audio and video is modulated to create a transport stream for transmission either by a terrestrial radio frequency (RF) transmission, satellite RF transmission, cable television transmission, or storage on optical storage media such as the DVD. The transport stream is received, or in the case of the DVD, replayed, demodulated and decoded to recreate the audio and video signals for reproduction on a television or display monitor.

"A Cost Effective HDTV Decoder IC with Integrated System Controller, Down Converter, Graphics Engine and Display Processor," Duardo, et al., IEEE Transactions on Consumer Electronics, August 1999, Volume: 45, Issue: 3, pp.: 879-883 describes a digital high definition television (HDTV) that supports MPEG-2 and other standards. Refer now to FIG. 1 for a discussion of a digital television video processor similar to that described in Durado, et al. A digital television processor 5 receives a digital television video stream 10 that has been received as a terrestrial RF transmission, satellite RF transmission, cable television transmission, or a data stream retrieved from a replayed DVD.

The demultiplexer 40 extracts video, audio, and data from the transport stream and sends it to the corresponding memory 20 via the memory controller 15. Data is stored in any of the memory 20 data queues. The demultiplexer 40 further creates the MPEG-2 transport layer packets that are reconciled into the packetized elementary streams. The packetized elementary streams are again buffered within the memory 20.

The stream processor 45 retrieves the MPEG-2 video elementary streams and converts the elementary streams to motion vectors and coefficients. The stream processor 45 further provides slice level error detection and concealment. The video decoder 50 receives the MPEG-2 compressed elementary streams. The video decoder 50 performs all required MPEG-2 functions such as motion compensation, inverse quantization, scaling, and etc. The optional graphics engine 55 provides all graphics functions and combines video with graphics.

The video format converter 60 retrieves the decompressed video data and converts the video data to generate the required raster formatting, timing, and filtering. The video format converter 60 generates the video signal as required by the display. In the case of a liquid crystal display (LCD) monitor this would be digital signals of the format required for the LCD. Alternately, in the instance of an analog display, the signals would be the red, green and blue analog signals necessary to drive the display.

The memory map is divided into buffers that retain compressed video, compressed audio, three frame stores for video decoding and display, graphics, data queues, and an address buffer. The memory controller 15 transfers data between the chip and the external memory 20 based on request order and priority. Each process has an assigned priority that determines when it is granted memory control relative to the other processes. Data received from memory 20 is stored in one of the line buffers 70a, 70b, 70c, and 70d until the requesting process can use it. Similarly, data to be stored in memory 20 is temporarily held line buffers 70a, 70b, 70c, and 70d until the direct memory access (DMA) interface 80 is allocated to the requesting process. The memory control function 85 manages the priority of the requesting processes, the locations, block sizes, and segmentation of the data within the memory 20.

The memory 20 maybe static random access memory (SRAM), RAMBUS dynamic random access memory (RDRAM), Synchronous dynamic random access memory (SDRAM), or other appropriately designed random access memory. The memory interface and bandwidth limitation is one of the most important design factors in a digital television system. Since all digital video processor systems require frame buffers, the memory 20 is commonly implemented as SDRAM. The memory controller 15 has become a major design consideration in digital video processor system. Due to the characteristics of SDRAM design, the access time is not a uniform parameter and thus causes a major design complexity in digital video processor systems. To resolve the non-uniform access time problem in SDRAM interface, the line buffers 70a, 70b, 70c, and 70d based on SRAM technology are required for the digital video processing system. The direct memory access controller 80 and line buffers 70a, 70b, 70c, and 70d have added major design complexity and die cost in most of the digital video processing integrated circuits.

The system processor 65 provides the interface provides the control, configuration, and detailed operational information useful for the video system configuration and debugging.

"Memory Organization of a Single-Chip Video Signal Processing System with Embedded DRAM," Hilgenstock, et al., Proceedings. Ninth Great Lakes Symposium on VLSI, 1999, pp.: 42-45 describes a programmable single-chip multiprocessor system for video coding applications. The multiprocessor system integrates four processing elements, on-chip DRAM, and application-specific interfaces. The integrated DRAM is primarily used as a frame buffer and makes external memory for most applications not necessary. For fast access to local data segments also static RAM is integrated in each processing element.

U.S. Pat. No. 4,941,107 (Hasebe) teaches an image data processor for processing image data in a pipe line fashion. The image data processor includes an access controller for selectively generating addresses and control data in synchronism with a memory cycle in response to a start command, and for selectively and separately outputting the addresses onto address buses and the control data onto control buses. Memory planes selectively receive one address from one of the address buses, control data from one of the control buses, and selectively output data stored at the received address onto one of the data buses in synchronism with the memory cycle. The image data processor selectively executes a predetermined processing operation on data received from the memory planes, and selectively stores a result of the processing operation to the memory planes.

U.S. Pat. No. 6,424,347 (Kwon) illustrates an interface control for a frame buffer. The interface control includes a byte swapping/sampling controller connected between the PCI host bus and a FIFO (First In First Out) for performing a data conversion between a big Endian data and a little Endian data or a data conversion between a system data and a user data. A byte conversion/view selection controller is connected between the FIFO and the SRAM for converting a pixel data stored in the FIFO from a 8 bit-1 byte data to a 9 bit-1 byte data in accordance with a view selected or converting a pixel data stored in the SRAM from a 9 bit-1 byte data into a 8 bit-1 byte in accordance with a view selected. A Rambus Access Controller controls transmission of pixel data between the SRAM and a RAM bus DRAM, and a display controller for receiving a pixel data outputted from the RAM bus DRAM through the Rambus Access Controller and outputting to a RAM D/A converter through the display bus, for thereby concurrently performing a pixel data conversion between a big Endian and a little Endian and a pixel data conversion for a 8 bit-1 byte and 9 bit-1 byte in a 8 bit-1 byte PCI host bus and a 9 bit-1 byte RAM bus DRAM each using a system memory having different byte definition and bus configuration.

U.S. Pat. No. 5,291,275 (Lumelsky) describes a triple field buffer for television image storage and visualization on raster graphics display. The image conversion apparatus provides for storing in a first memory a first image field and for storing in a second memory a second image field. The first and the second memories are read to retrieve the first and second image fields and the first and second image fields are simultaneously displayed on a display screen as a single image frame. During the reading of the first and second memories, a third image field is stored in a third memory. The first, second and third memories are structured as a frame buffer having a 3×3 memory block organization. For image fields numbered 1, 2, 3, 4, 5, . . . , n, the system reads the image fields two at a time in accordance with a predetermined sequence given by: 1 and 2, 2 and 3, 3 and 4, 4 and 5, (n−1) and n, n and (n+1). A high resolution frame length is selected to be longer than or shorter than a television field period. The phase difference between the two is measured and circuitry alters the predetermined read-out sequence to ensure that a field memory to be read will not also be required for simultaneously storing a next television field.

U.S. Pat. No. 6,263,023 (Ngai) teaches a high definition television decoder. The high definition television video decoder decodes data at a high rate using multiple slower slice decoders. A common memory is shared by all slice decoders drastically reducing storage requirements of individual decoders. Slices of the HDTV signals are allocated to decoders optimally in response to busy signals providing improved performance.

SUMMARY OF THE INVENTION

An object of this invention is to provide a high bandwidth data path to memory system and a low latency no wait state data path for a memory system functioning as a frame buffer for a digital video processing system.

Another object of this invention is to provide a digital video processing system with configurable channels that are programmable to control the access pattern of the memory controller.

Further another object of this invention is to provide a digital video processing system that, once the configurable channels are programmed, the memory controller can continuously access the memory and move the data to the channel buffers.

To accomplish at least one of these objects, a configurable memory system is in communication with a processing system for selectively writing and reading data according to segment patterns. The configurable memory system is exemplary of a frame buffer of a video processing system. The video processing system receives, demodulates, decodes, and converts digital television signals for display on a television monitor. The configurable memory system has an array of memory devices and a configurable memory control apparatus. The configurable memory control apparatus is in communication with the array of memory devices for selectively writing and reading data from the array of memory devices. The configurable memory control apparatus is further in communication with the processing system for receiving the data from and transferring the data to the processing system. The array of memory devices is preferably Synchronous DRAM.

The configurable memory control apparatus includes a memory control device in communication with the array of memory devices to generate and transfer address, timing, and control signals necessary for selectively writing the data to and reading the data from selected blocks of the array of memory devices to the selected blocks of the array of memory devices. The configurable memory control apparatus further has a plurality of control channel devices in communication with the memory controller and in communication with the processing system via the control path.

Each control channel device receives and retains configuration data from the processing system defining at least one segment pattern for the data required by the processing system. The control channel device further defines the timing and location of the segment pattern of the data within the array of memory devices. Each control channel device transfers the segment pattern to the memory control device.

An arbiter device is in communication between the memory control device and the plurality of control channel devices to determine a priority in the control channel devices at which the defined segments of data are to be selectively written to and read from the array of memory devices.

The configurable memory system additionally includes a plurality of channel buffers in communication with the memory control device and in communication with the processing system. Each channel buffer receives, retains, and transfers a defined segment of the data as defined by the segment pattern between the processing system and the array of memory devices, such that the processing system is able to transfer and receive the data continuously according to data requirements of the processing system. The channel buffers are SRAM.

DETAILED DESCRIPTION OF THE INVENTION

Figure 1:
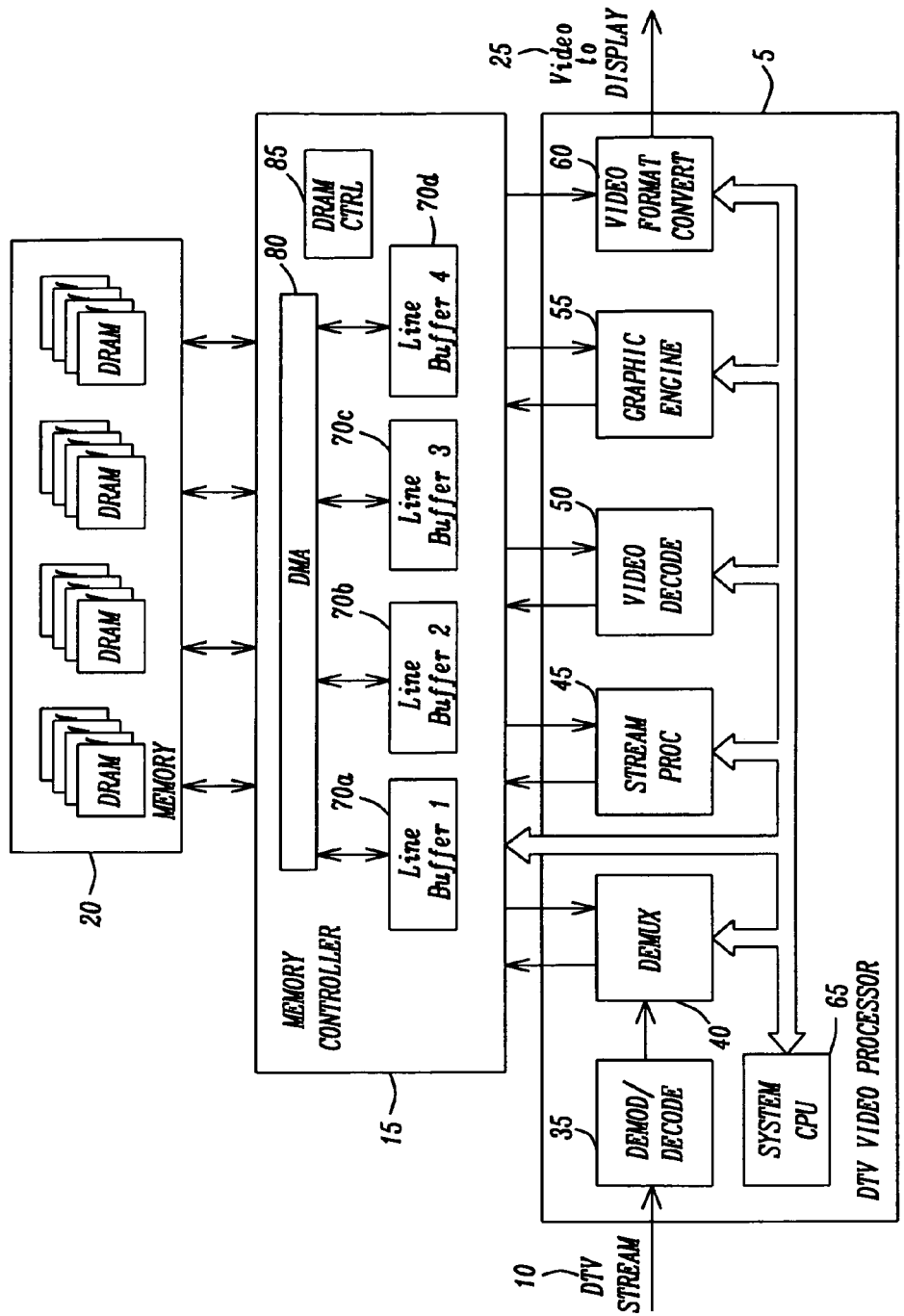
FIG. 1 is a block diagram illustrating a video processing system having a frame buffer constructed from a memory system of the prior art.
Figure 2:
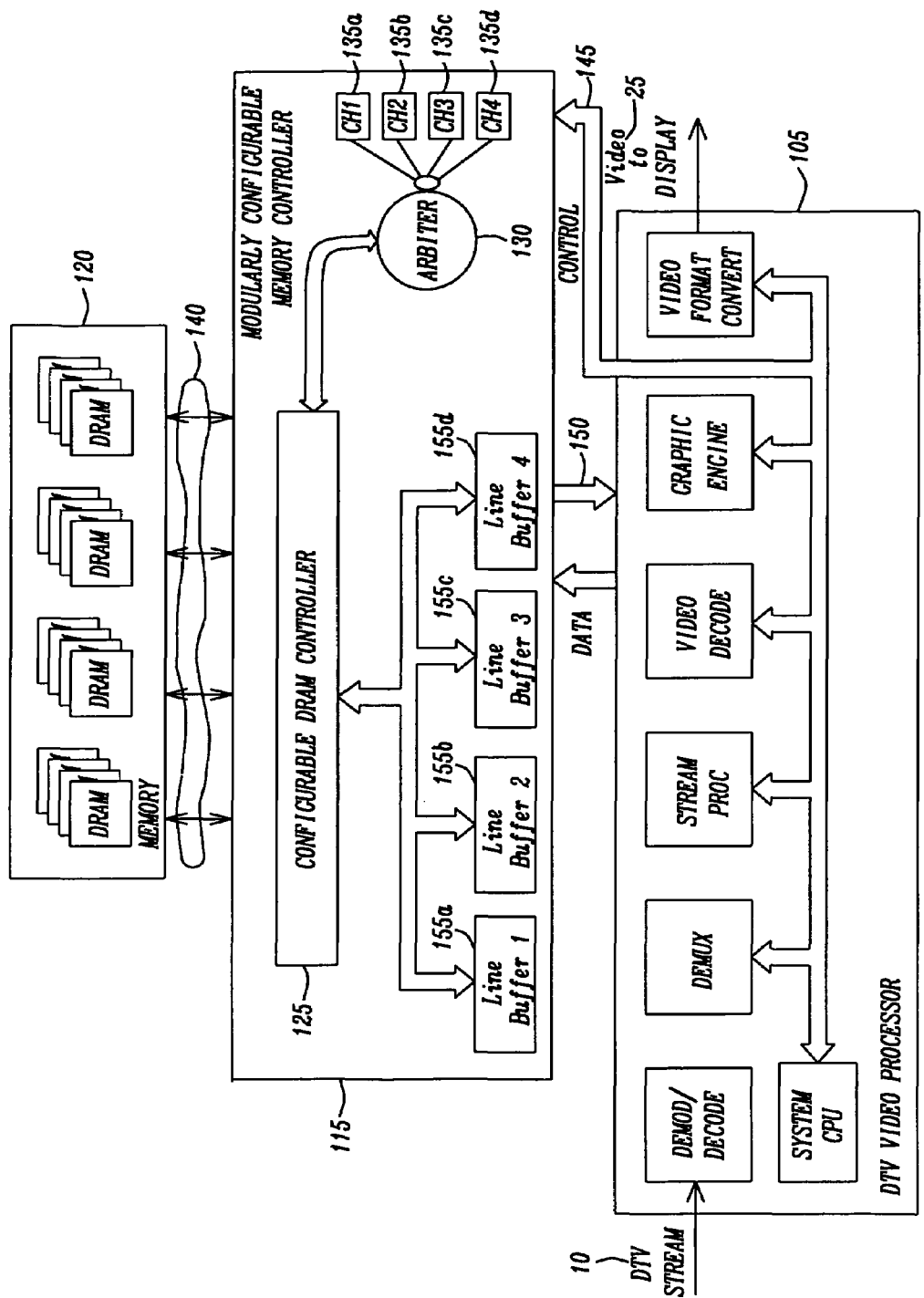
FIG. 2 is a block diagram illustrating a video processing system having a frame buffer constructed from a configurable memory system of this invention.

The digital video processing system of this invention, as shown in FIG. 2, has a video processor 105 for receiving, demodulating, and converting digital video signals 10 to video signals 25 formatted for display on a display monitor. The structure of the video processor 105 is as described above except that the interface between the video processor 105 and the memory system is simplified to a data flow interface, i.e., no address or data read/write control The video processor 105 requires that the video data to have certain patterns which can be programmed such that the simplified dataflow interface is possible. The memory 120 appears as the frame buffers as they are required for each of the functions of the video processor 105. With the segment patterns programmed in the modularly configurable memory controller 115, the access time of the memory 120 appears to the video processor 105 is as fast as an SRAM but the total memory capacity is as large as a DRAM system, thus reducing the total memory cost.

The complexity of the memory interface 140 is hidden from the video processor 105 so that the design complexity of the video processor 105 is greatly reduced. The interface between the video processor 105 and the modularly configurable memory processor 115 provides the control for programming the configurable channels 135a, 135b, 135c, and 135d and for initiating the appropriate accesses for writing to and reading from the memory 120. The interface further provides the data interface 150 for the transfer of the segments of the video data according to the segment patterns as programmed in the configurable channels 135a, 135b, 135c, and 135d. This interface may now be as simple as a serial interface operating at the required bandwidth for providing the functional units of the video processor 105 at their required speed.

The control interface 145 and the data interface 150 are in communication with the line buffers 155a, 155b, 155c, and 155d. The line buffers receive the data to be transferred between the video processor 105 and the memory 120. The line buffers 155a, 155b, 155c, and 155d are SRAM configured to act as a cache to retain the defined segments of data to be transferred. The line buffers 155a, 155b, 155c, and 155d provide the appropriate timing and formatting to insure that the video processor 105 is able to send and receive the data segments with no wait states for the memory 120. The data segments are defined by the access segment patterns. The configurable channels 135a, 135b, 135c, and 135d, are programmed to control the access segment pattern to and from the memory 120 with no intervention from the video processor 105.

The configurable DRAM controller 125 receives the segment patterns from the configurable channels 135a, 135b, 135c, and 135d and generates the appropriate memory device address, timing, and control signals necessary for selectively writing the data to and reading the data from the selected blocks of the memory 120. An arbiter 130 determines the priority of a function the video processor 105 and when simultaneous operations are requested, communicates the priority of the segment patterns to be accessed to the configurable DRAM controller 125 to ensure that the video data is transferred to maintain the video signal 25 transfer to the display.

In the preferred embodiment the memory 120 is preferably implemented as SDRAM. However, memory technologies such as static random access memory (SRAM), RAMBUS dynamic random access memory (RDRAM), or other appropriately designed random access memory maybe employed to implement the memory 120 and still be in keeping with the intent of this invention.

The configurable channels 135a, 135b, 135c, and 135d retain the segment patterns that are defined as follows:

1. The starting address within the memory 120 for a defined segment of the video data.
2. The size of each block of the defined segment of the video data.
3. The offset of each block of the defined segment of the video data within the memory 120. Each block maybe separated from each other block by a uniform address space to facilitate access of the blocks.
4. The increment/decrement flag for the block counter. The blocks of the segment of video data maybe written to the memory 120 in a particular order and then read from the memory 120 in a reverse order. The increment/decrement flag determines the ordering of the blocks of the segment of the video data.
5. The repeat counter is set to for the number of times a given segment is access in a particular operation.
6. The increment/decrement offset size provides the amount segment of video data is offset in the access of multiple segments of the video data.
7. The start and stopping timing determining when each segment of the video data is to be transferred to the video processor 105.
8. The priority flag sets which video data segments have priority over segments to ensure continuous flow of the video data for the video processor 105.

The configurable channels 135a, 135b, 135c, and 135d are programmed with the configuration data to control the access pattern of video data written to or video data read from the memory 120 without the intervening of the video processing system 105.

The modularly configurable memory controller 115 of this invention can be an embedded circuit within an integrated circuit chip implementing the video processing system. In this type of implementation the control path 145 and the data path 150 is a parallel data path between the modularly configurable memory controller 115 and the video processing system 105.

Alternately, the modularly configurable memory controller 115 may be implemented as a separate application specific integrated circuit (ASIC) chip. The modularly configurable memory controller 115 then may be incorporated on a printed circuit board with the memory 120 and video processor 105. In such case, the data path 140 between the memory 120 and the modularly configurable memory controller 115 and control path 145 and the data path 150 the video processor 105 may be a serial channel such as high speed low voltage differential signaling (LVDS) interface.

Figure 3:
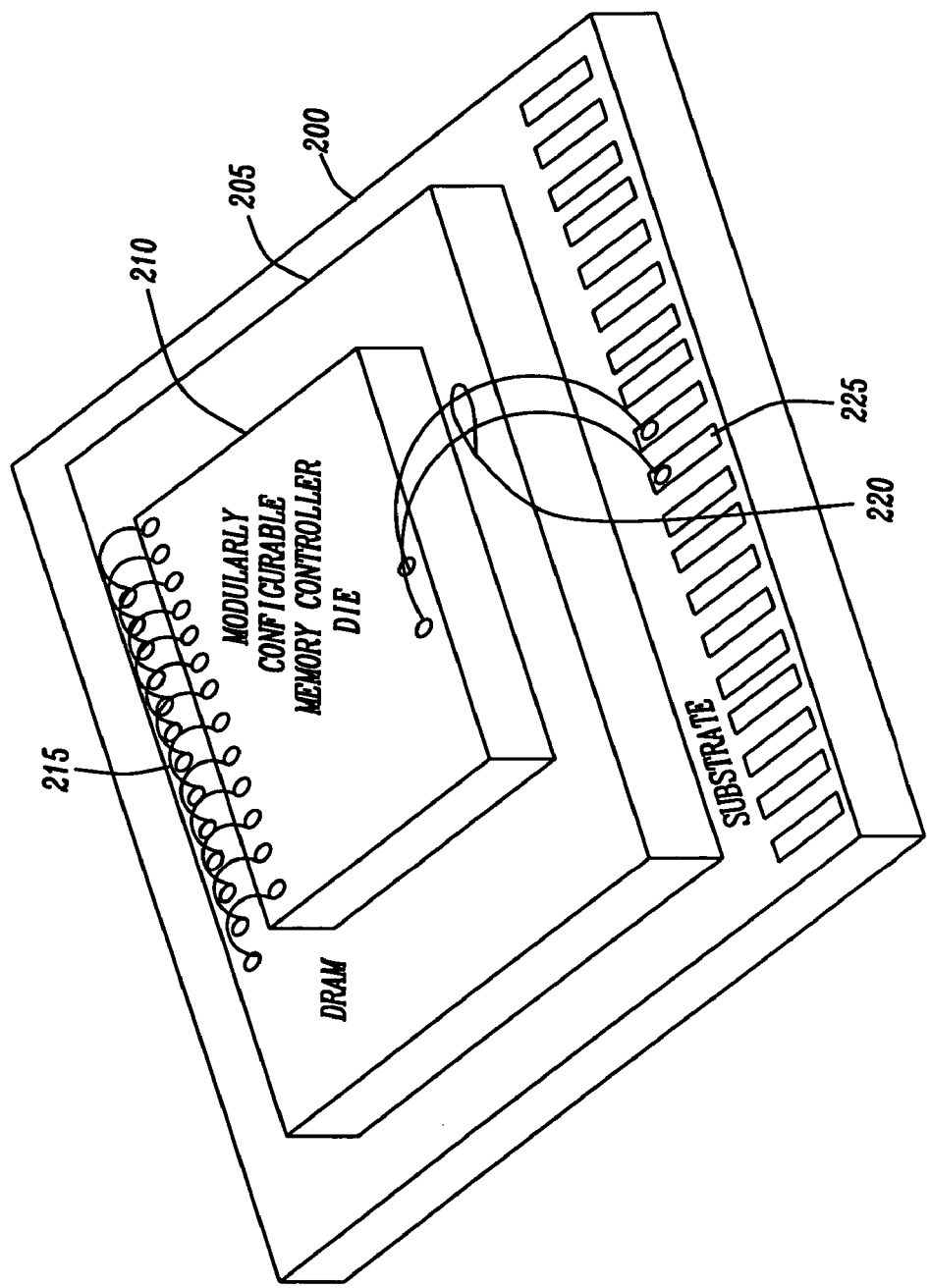
FIG. 3 is an illustration of the packaging diagram of the physical structure configurable memory system of this invention.

7. An alternate form of packaging the separate modularly configurable memory controller 115 in the ASIC chip is to create configurable video memory system. The separate die of the modularly configurable memory controller 115 is stacked with a memory die as shown in FIG. 3 to form an integrated configurable video memory system. The memory die 205 is mounted to a substrate 200 using known techniques such as organic adhesives. On the memory die 205, the modularly configurable memory controller die 210 is similarly attached to the memory die 205 using the known attachment techniques. The control and data interface of the modularly configurable memory controller die 210 is implemented as the LVDS interface. The LVDS interface is connected between the input/output pads of the modularly configurable memory controller die 210 and the input/output pads 225 of the substrate 225 by the wirebond connections 220. The data and control interface of the memory die 210 is connected from the input/output pads of the memory die 210 to the input/output pads of the modularly configurable memory controller die 215 by the wirebonds 215.

This multiple die modularly configurable memory system provides a serial data link path with low latency, no wait state yet high capacity of a DRAM system. The modularly configurable memory system as shown is then encapsulated and connected as a single in-line package (SIP). Structured as such, the modularly configurable memory system of this invention reduces the design cost in a digital television system while increasing the performance for the system.

In summary, the modularly configurable memory controller of this invention provides circuitry performs the function of controlling selective writing data to and reading data from an array of memory devices and for receiving the data from and transferring the data to a processing system. The video processor 105 provides configuration data that is stored in a designated configurable channel 135a, 135b, 135c, and 135d to define the segment patterns for the video data required by the video processing system and to define timing and location of the segment pattern of the data within the memory 120. The video processor 120 transfers the configuration data that is received and retained within the configurable channels 135a, 135b, 135c, and 135d. The configurable DRAM controller 125 receives a designated segment pattern from one of the configurable channels 135a, 135b, 135c, and 135d. The configurable DRAM controller 125 generates and transfers address, timing, and control signals to the memory 120 necessary for selectively writing the data to and reading the data from the selected blocks of the memory 120 to selected blocks of the memory 120 as defined by the segment pattern. The defined segments of the video data as defined by the segment patterns are transferred between the memory 120 and the line buffers 155a, 155b, 155c, and 155d. The line buffers 155a, 155b, 155c, and 155d then transfer the defined video data continuously according to data requirements of the appropriate functions of the video processor 105. The arbiter determines a priority in the control channel devices at which the defined segments of data are to be selectively written to and read from the array of memory devices.

While this invention has been particularly shown and described with reference to the preferred embodiments thereof, it will be understood by those skilled in the art that various changes in form and details may be made without departing from the spirit and scope of the invention.

The invention claimed is:

1. A configurable memory control apparatus in communication with an array of memory devices for selectively writing and reading data from said array of memory devices and in communication with a processing system for receiving said data from and transferring said data to said processing system according to segment pattern definition data; said configurable memory control apparatus comprising:
    a configurable memory control device in communication with said array of memory devices to generate and transfer to selected blocks of said array of memory devices address, timing, and control signals necessary for selectively writing said data to and reading said data from said selected blocks of said array of memory devices according to segment pattern definition data;
    a plurality of channel configuration devices in communication with said configurable memory control device and in communication with said processing system via a control path,
        each channel configuration device receiving and retaining the segment pattern definition data from said processing system to define at least one segment pattern for said data required by said processing system and defining location, size, offset, write/read order, repetition count, timing, and priority of said segment pattern of said data within said array of memory devices, and
        each channel configuration device transferring said segment pattern definition data to said configurable memory control device such that the configurable memory control device structures its operation for transfer of the data to and reading said data from said selected blocks of said array of memory devices according to segment pattern definition data; and
    an arbiter device in communication between the memory control device and the plurality of channel configuration devices to determine a priority for said channel configuration devices at which said defined segments of data are to be selectively written to and read from said array of memory devices according to a priority defined by the segment pattern definition data.

2. The configurable memory control apparatus of claim 1 further comprising:
    a plurality of line buffers in communication with the configurable memory control device and in communication with the processing system, each line buffer performing as a cache for receiving, retaining, and transferring a defined segment of said data with appropriate timing and formatting as defined by said segment pattern definition data between said processing system and said array of memory devices, such that said processing system is able to transfer and receive said data continuously according to data requirements of said processing system as defined by said segment pattern definition data.

3. The configurable memory control apparatus of claim 1 wherein said array of memory devices are SDRAM.

4. The configurable memory control apparatus of claim 1 wherein said line buffers are SRAM.

5. The configurable memory control apparatus of claim 1 wherein said processing system is video processing system.

6. The configurable memory control apparatus of claim 1 wherein said processing system receives, demodulates, decodes, and converts digital television signals for display on a television monitor.

7. The configurable memory control apparatus of claim 1 wherein said configurable memory control device generates address, timing, and control signals for said array of memory devices based on said segment patterns to write and read said data according to the segment pattern definition data.

8. A configurable memory system in communication with a processing system for selectively writing and reading data according to segment patterns according to segment pattern definition data, comprising:
    an array of memory devices;
    a configurable memory control apparatus in communication with the array of memory devices for selectively writing and reading data from said array of memory devices and in communication with the processing system for receiving said data from and transferring said data to said processing system according to the segment pattern definition data, said configurable memory control apparatus comprising:
        a configurable memory control device in communication with said array of memory devices to generate and transfer to selected blocks of said array of memory devices address, timing, and control signals necessary for selectively writing said data to and reading said data from said selected blocks of said array of memory devices according to the segment pattern definition data;

a plurality of channel configuration devices in communication with said configurable memory control device and in communication with said processing system via a control path, each channel configuration device receiving and retaining the segment pattern definition data from said processing system to define at least one segment pattern for said data required by said processing system and defining location, size, offset, write/read order, repetition count, timing, and priority of said segment pattern of said data within said array of memory devices, and each channel configuration device transferring said segment pattern definition data to said configurable memory control device such that the configurable memory control device structures its operation for transfer of the data to and reading said data from said selected blocks of said array of memory devices according to segment pattern definition data, and an arbiter device in communication between the configurable memory control device and the plurality of channel configuration devices to determine a priority according to the segment pattern definition data at which said defined segments of data are to be selectively written to and read from said array of memory devices according to a priority defined by the segment pattern definition data.

9. The configurable memory system of claim 8 wherein said configurable memory control apparatus further comprises:

a plurality of line buffers in communication with the configurable memory control device and in communication with the processing system, each line buffer performing as a cache for receiving, retaining, and transferring a defined segment of said data with appropriate timing and formatting as defined by said segment pattern definition data between said processing system and said array of memory devices, such that said processing system is able to transfer and receive said data continuously according to data requirements of said processing system as defined by said segment pattern definition data.

10. The configurable memory system of claim 8 wherein said array of memory devices are SDRAM.

11. The configurable memory system of claim 8 wherein said line buffers are SRAM.

12. The configurable memory system of claim 8 wherein said processing system is video processing system.

13. The configurable memory system of claim 8 wherein said processing system receives, demodulates, decodes, and converts digital television signals for display on a television monitor.

14. The configurable memory system of claim 8 wherein said configurable memory control device generates address, timing, and control signals for said array of memory devices based on said segment patterns to write and read said data according to the segment pattern definition data.

15. A digital video system comprising:

a video processor for receiving, demodulating, and converting digital video signals for display on a display monitor;

a configurable memory system in communication with the video processor for selectively writing and reading data according to segment patterns, comprising:

an array of memory devices;

a configurable memory control apparatus in communication with the array of memory devices for selectively writing and reading data from said array of memory devices and in communication with the video processor for receiving said data from and transferring said data to said video processor;

said configurable memory control apparatus comprising:

a configurable memory control device in communication with said array of memory devices to generate and transfer to selected blocks of said array of memory devices address, timing, and control signals necessary for selectively writing said data to and reading said data from said selected blocks of said array of memory devices according to the segment pattern;

a plurality of channel configuration devices in communication with said memory controller and in communication with said video processor via a control path, each channel configuration device receiving and retaining segment pattern definition data from said video processor to define at least one segment pattern for said data required by said video processor and defining location, size, offset, write/read order, repetition count, timing, and priority of said segment pattern of said data within said array of memory devices, and each control channel device transferring said segment pattern definition data to said configurable memory control device such that the configurable memory control device structures its operation for transfer of the data to and reading said data from said selected blocks of said array of memory devices according to segment pattern definition data and an arbiter device in communication between the memory control device and the plurality of channel configuration devices to determine a priority in said channel configuration devices at which said defined segments of data are to be selectively written to and read from said array of memory devices according to a priority defined by the segment pattern definition data.

16. The digital video processing system of claim 15 wherein said configurable memory control apparatus further comprises:

a plurality of line buffers in communication with the memory control device and in communication with the video processor, each channel buffer performing as a cache for receiving, retaining, and transferring a defined segment of said data as defined by said segment pattern definition data between said video processor and said array of memory devices, such that said video processor is able to transfer and receive said data with appropriate timing and formatting continuously according to data requirements of said video processor as defined by said segment pattern definition data.

17. The digital video processing system of claim 15 wherein said array of memory devices are SDRAM.

18. The digital video processing system of claim 15 wherein said line buffers are S RAM.

19. The digital video processing system of claim 15 wherein in said digital video processing system receives digital television signals for demodulation, decoding, and converting for display on a television monitor.

20. The digital video processing system of claim 15 wherein said configurable memory control device generates address, timing, and control signals for said array of memory device based on said segment patterns to write and read said data according to a priority defined by the segment pattern definition data.

21. A method for configurably controlling selective writing data to and reading data from an array of memory devices and for receiving said data from and transferring said data to a processing system according to segment pattern definition data, the method comprising the steps of:

defining at least one segment pattern for said data required by said processing system and defining location, size, offset, write/read order, repetition count, timing, and priority of said segment pattern of said data within said array of memory devices;

receiving and retaining segment pattern definition data of said segment pattern as defined;

generating and transferring address, timing, and control signals necessary for selectively writing said data to and reading said data from said selected blocks of said array of memory devices to selected blocks of said array of memory devices as defined by said segment pattern definition data;

retaining, and transferring a defined segment of said data as defined by said segment pattern definition data between said processing system and said array of memory devices, such that said processing system is able to transfer and receive said data continuously according to data requirements of said processing system, and arbitrating to determine an order at which said defined segments of data are selectively written to and read from said array of memory devices according to a priority defined by the segment pattern definition data to transfer and receive said data continuously according to data requirements of said processing system.

22. The method of claim 21 wherein said array of memory devices are SDRAM.

23. The method of claim 21 wherein retaining, and transferring a defined segment of said data as defined by said segment pattern definition data is performed by line buffers, said line buffers are implemented as SRAM.

24. The method of claim 21 wherein said processing system is video processing system.

25. The method of claim 21 wherein said processing system receives, demodulates, decodes, and converts digital television signals for display on a television monitor.

26. An apparatus for configurably controlling selective writing data to and reading data from an array of memory devices and for receiving said data from and transferring said data to a processing system according to the segment pattern, the apparatus comprising:

means for defining at least one segment pattern for said data required by said processing system and defining location, size, offset, write/read order, repetition count, timing, and priority of said segment pattern of said data within said array of memory devices;

means for receiving and retaining segment pattern definition data of said segment pattern as defined; and means for generating and transferring address, timing, and control signals necessary for selectively writing said data to and reading said data from said selected blocks of said array of memory devices to selected blocks of said array of memory devices as defined by said segment pattern definition data;

means for retaining and transferring a defined segment of said data as defined by said segment pattern definition data between said processing system and said array of memory devices, such that said processing system is able to transfer and receive said data continuously according to data requirements of said processing system, and means for arbitrating to determine an order at which said defined segments of data are selectively written to and read from said array of memory devices according to a priority defined by the segment pattern definition data to transfer and receive said data continuously according to data requirements of said processing system.

27. The apparatus of claim 26 wherein said array of memory devices are SDRAM.

28. The apparatus of claim 26 wherein means for retaining, and transferring a defined segment of said data as defined by said segment pattern definition data comprise line buffers, said line buffers are SRAM.

29. The apparatus of claim 26 wherein said processing system is video processing system.

30. The apparatus of claim 26 wherein said processing system receives, demodulates, decodes, and converts digital television signals for display on a television monitor.

* * * * *